(12) United States Patent
Pi

(10) Patent No.: US 9,866,263 B1
(45) Date of Patent: Jan. 9, 2018

(54) APPARATUS AND METHODS FOR SIGNAL SENSING-BASED RF UNIT CONTROL

(71) Applicant: Straight Path Ventures, LLC, Glen Allen, VA (US)

(72) Inventor: Zhouyue Pi, Allen, TX (US)

(73) Assignee: Straight Path Ventures, LLC, Glen Allen, VA (US)

( * ) Notice: Subject to any disclaimer, the term of this patent is extended or adjusted under 35 U.S.C. 154(b) by 0 days.

(21) Appl. No.: 15/291,616

(22) Filed: Oct. 12, 2016

(51) Int. Cl.
*H04B 1/44* (2006.01)

(52) U.S. Cl.
CPC ........................ *H04B 1/44* (2013.01)

(58) Field of Classification Search
None
See application file for complete search history.

(56) References Cited

U.S. PATENT DOCUMENTS

| | | | | |
|---|---|---|---|---|
| 5,446,770 A * | 8/1995 | Urabe | ............ | H04B 1/30 375/219 |
| 6,370,361 B1 * | 4/2002 | Hung | ............ | H04B 1/403 455/260 |
| 6,766,156 B1 * | 7/2004 | Hayashihara | ............ | H04B 1/109 330/296 |
| 2006/0035601 A1 * | 2/2006 | Seo | ............ | H04B 1/40 455/78 |
| 2007/0264943 A1 * | 11/2007 | Darabi | ............ | H04B 1/123 455/88 |
| 2015/0372710 A1 * | 12/2015 | Longhurst | ............ | H04B 1/0053 455/78 |

* cited by examiner

*Primary Examiner* — David Bilodeau

(57) ABSTRACT

A wireless apparatus comprising: i) an intermediate frequency (IF) unit configured to transmit and to receive IF signals; and ii) a radio frequency (RF) unit configured to transmit and to receive RF signals via an antenna and to receive IF signals from the IF unit and to transmit IF signals to the IF unit. The RF unit comprises: iii) a first sensor coupled to a first port of the RF unit, wherein the first sensor is configured to determine whether an incoming IF signal transmitted by the IF unit is present on the first port; and iv) a first transceiver configured to be controlled by the first sensor. The first transceiver is switched to transmit mode in response to the first sensor determining that an incoming IF signal is present on the first port.

20 Claims, 10 Drawing Sheets

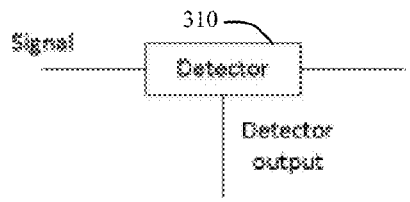
FIGURE
3A
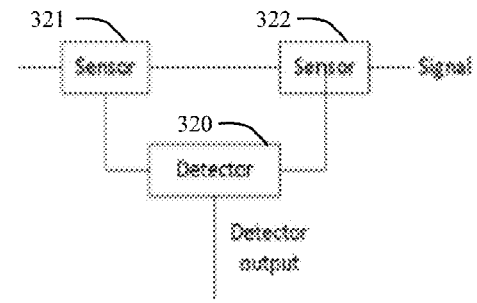
FIGURE
3B
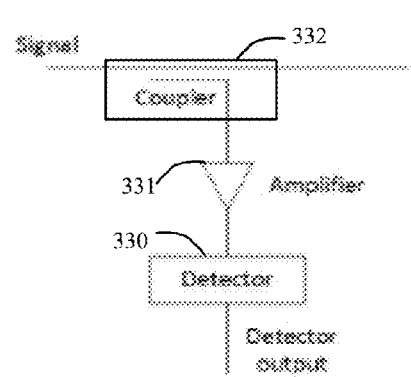
FIGURE
3C
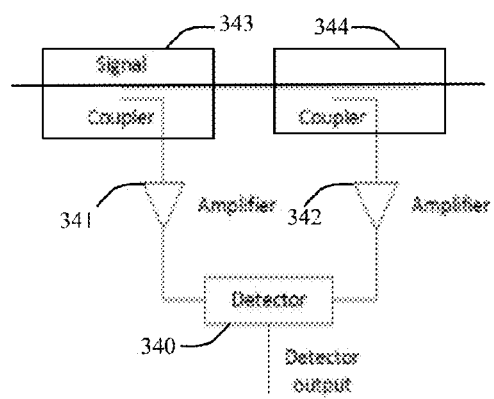
FIGURE
3D

US 9,866,263 B1

APPARATUS AND METHODS FOR SIGNAL SENSING-BASED RF UNIT CONTROL

TECHNICAL FIELD

The present application relates generally to wireless base stations and consumer premises equipment (CPE) and, more specifically, to wireless base stations and CPE having a separate radio frequency (RF) unit that includes at least one transceiver and an intermediate (IF) and baseband unit.

BACKGROUND

The success of the 3G and 4G cellular communication technologies, together with the success of Wi-Fi, has spurred explosive growth of wireless traffic. It is expected that broadband access via smartphones and other devices is going to be ubiquitous, and billions of devices will be connected—mostly wirelessly—to become part of the so-called Internet of Things (IoT). This trend presents tremendous opportunities—and challenges—for wireless communication to provide connectivity and capacity for these billions of people and machines.

In a wireless communication device, a transceiver is a unit that performs the function of both a transmitter and a receiver. Typically, a transceiver interfaces with a lower-frequency unit (e.g., an intermediate frequency (IF) unit) and digital processors (e.g., a baseband unit) at one end, and antennas at the other. In transmit (TX) mode, the transceiver receives the outgoing signals from the digital processors and/or lower-frequency units and performs functions such as I/Q modulation, frequency conversion (i.e., up-conversion to radio frequency (RF) signals), filtering, phase shifting, amplification, and the like. The amplified signals are then radiated over the air via the antennas. In receive (RX) mode, the transceiver receives the incoming RF signals from the antennas and performs functions such as amplification, filtering, phase shifting, frequency conversion (i.e., down-conversion to IF or baseband signals), FQ demodulation, and the like. The output of the receiver is then fed into the lower-frequency units or digital processors for further processing, such as channel estimation, MIMO processing, demodulation, decoding, and additional processing further up in the communication and networking protocol stack. In a device that supports beamforming or multiple-input-multiple-output (MIMO) operations, there are often multiple transceivers in an RF unit.

A typical wireless communication device may comprise a radio frequency (RF) unit, an intermediate frequency (IF) unit, a baseband (BB) unit, and a network processor. The RF unit may include at least one transceiver that operates in at least one frequency band within the frequency range from a few hundred megahertz to a few hundred gigahertz. The RF unit communicates with the intermediate frequency (IF) unit and baseband unit via a data interface and a control interface. Typically, the baseband unit or the network processor controls the configurations and operations of the transceivers. That is, the baseband unit or network processor sends control commands to the RF unit to switch the transceiver between TX mode and RX mode, and change other configurations of the RF unit. The control command is typically sent to the RF unit via a control interface that is separate from the data interface, which may comprise multiple data communication ports. Note the control interface may share the same physical connection or wires with the data interface.

However, in certain situations, a user may find it advantageous to use the RF unit in conjunction with another device. For example, the RF unit may operate in a millimeter-wave frequency band, such as the 24 GHz, 28 GHz, 37 GHz, or 39 GHz bands. Another device may perform networking, baseband processing, and also transceiver operations with a lower operating frequency at 2.4 GHz or 5 GHz (e.g., a Wi-Fi or Wi-Fi-based device). For simplicity, this separate device may be generically referred to as the "IF and baseband unit". The RF unit can then interface with this IF and baseband unit, performing the frequency conversion between 2.4 GHz (or 5 GHz) and the millimeter-wave frequency bands.

However, many times these Wi-Fi or Wi-Fi-based devices lack the control interface to control an external RF unit. In particular, since Wi-Fi devices transmit and receive in the same frequency, these devices either work in transmit mode or receive mode at any time instance. The transmission/reception (TX/RX) mode switch signal may not be readily available for the RF unit that is external to the Wi-Fi or Wi-Fi based devices. This lack of a TX/RX mode control signal prevents the easy integration of an RF unit with an off-the-shelf IF and baseband unit.

Therefore, there is a need in the art for an improved modular wireless communication device. In particular, there is a need for a modular RF unit that may be easily integrated with a modular IF and baseband unit without the need for a TX/RX control signal from the IF and baseband unit that controls the transmit/receive mode of the RF unit.

SUMMARY

To address the above-discussed deficiencies of the prior art, it is a primary objective to provide a wireless apparatus comprising a radio frequency (RF) unit configured to transmit and to receive RF signals via an antenna and to receive intermediate (IF) signals from an IF unit and to transmit IF signals to the IF unit. The RF unit comprises: iii) a first sensor coupled to a first port of the RF unit, wherein the first sensor is configured to determine whether an incoming IF signal transmitted by the IF unit is present on the first port; and iv) a first transceiver configured to be controlled by the first sensor, wherein the first transceiver is switched to transmit mode in response to the first sensor determining that an incoming IF signal is present on the first port.

In one embodiment, the first transceiver is switched to receive mode in response to the first sensor determining that an incoming IF signal is not present on the first port.

In another embodiment, the first transceiver is switched off in response to the first sensor determining that an incoming IF signal is not present on the first port.

In still another embodiment, the RF unit further comprises a first controller coupled to the first sensor and configured to receive a first control signal from the first sensor, wherein the first controller switches the first transceiver to transmit mode.

In yet another embodiment, the first controller switches the first transceiver to transmit mode in response to the first control signal indicating that the first sensor determined that an incoming IF signal is present on the first port.

In a further embodiment, the RF unit further comprises: i) a second sensor coupled to a second port of the RF unit, wherein the second sensor is configured to determine whether an incoming IF signal transmitted by the IF unit is present on the second port; and ii) a second transceiver configured to be controlled by the second sensor, wherein the second transceiver is switched to transmit mode in response to the second sensor determining that an incoming IF signal is present on the second port.

In a further embodiment, the first controller is coupled to the second sensor and configured to receive a second control signal from the second sensor, wherein the first controller switches the second transceiver to transmit mode.

In a still further embodiment, the first controller switches the second transceiver to transmit mode in response to either the first control signal indicating that the first sensor determined that an incoming IF signal is present on the first port or the second control signal indicating that the second sensor determined that an incoming IF signal is present on the second port.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A-3D illustrates exemplary signal sensors according to different embodiments of the disclosure.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless device.

The present disclosure describes systems and methods that i) detect characteristics of signals between an RF unit and an intermediate frequency (IF) and baseband unit, and ii) configure and control the RF unit based on the detected signal characteristics. The disclosed systems and methods allow RF units that would otherwise require explicit control (e.g., transmit (TX)/receive (RX) mode switching) to interoperate with wireless communication devices that provide IF and baseband processing but not explicit TX/RX mode switching control to the RF unit. This eliminates the need to provide a TX/RX switch control signal from the control interface. In cases where the TX/RX switch signal is the only control signal needed to operate the RF unit, the disclosed systems and methods allow the system to operate without a control interface between the RF unit and the IF and baseband device altogether.

Figure 1:
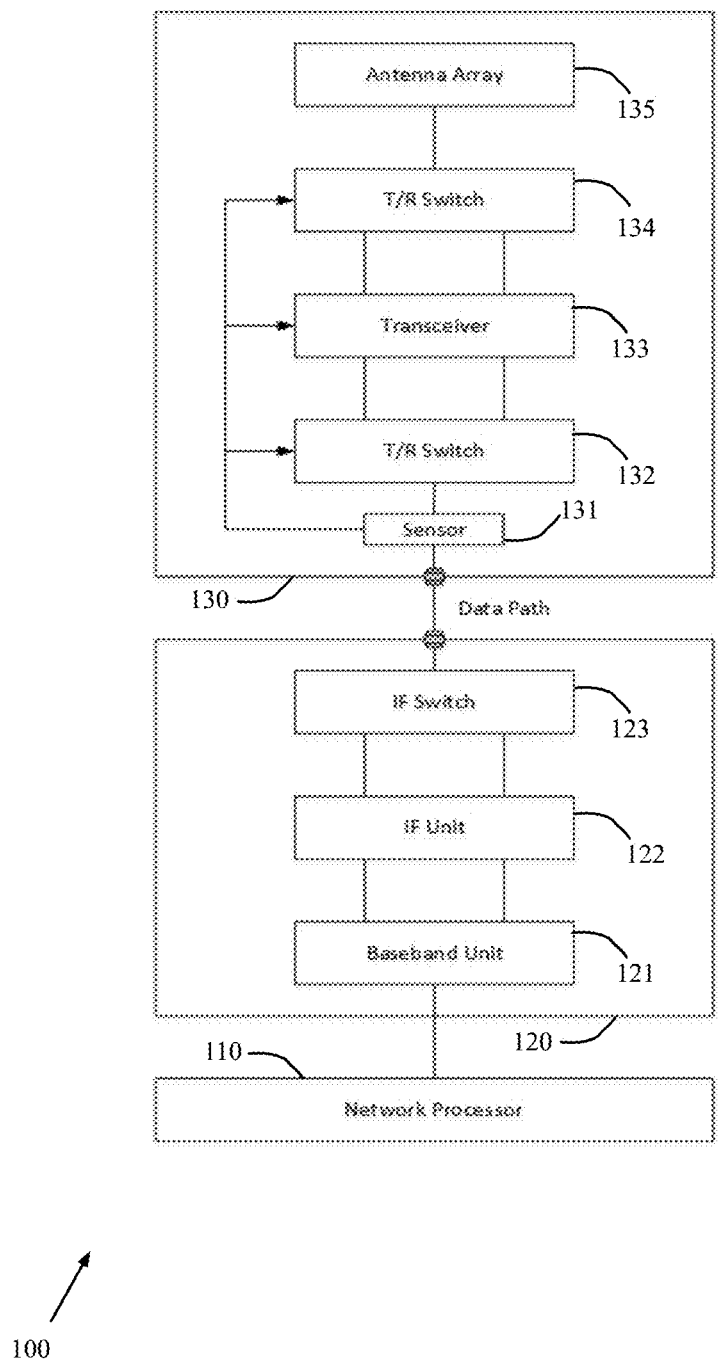
FIG. 1 illustrates a wireless apparatus that uses signal sensing-based control of an RF unit with a single transceiver coupled to an intermediate frequency (IF) and baseband unit according to an embodiment of the disclosure.

FIG. 1 illustrates wireless apparatus 100, which uses signal sensing-based control of RF unit 130 coupled to an intermediate frequency (IF) and baseband unit 120 according to an embodiment of the disclosure. Wireless apparatus 100 also comprises network processor 110. Broadly speaking, wireless apparatus 100 may be any type of wireless communication system (e.g., cellular base station, mobile phone, wireless access point (AP), Wi-Fi terminal, and the like), but is advantageously embodied in a base station or consumer premises equipment (CPE) that may be implemented in a configuration in which RF unit 130 and IF and baseband unit 120 are separate and independent modules.

Network processor transmits outgoing baseband data to IF and baseband unit 120 and receives incoming baseband data from IF and baseband unit 120. IF and baseband unit 120 comprises baseband unit 121, IF unit 122, and IF switch 123. IF switch 123 controls the data path (i.e., TX/RX switch mode) to RF unit 130. In transmit (TX) mode, IF unit 122 up-converts baseband data from baseband unit 121 to intermediate frequency (IF) and sends the outgoing IF signal to IF switch 123. In receive (RX) mode, IF unit 122 receives an incoming IF signal from IF switch 123 and down-converts from intermediate frequency (IF) to baseband data. Baseband unit 121, either alone or in conjunction with network processor 110, performs functions such as channel estimation, multiple-input, multiple-output (MIMO processing, demodulation, and decoding, and other functions in the communication and networking protocol stack.

RF unit 130 comprises sensor 131, transmit/receive (T/R) switch 132, transceiver 133, transmit/receive (T/R) switch 134, and antenna array 135. T/R switches 132 and 134 are controlled by sensor 131, which detects whether an IF signal is received from IF and baseband unit 120 and, in response to the detection, determines whether T/R switches 132 and 134 are configured to direct incoming signals from antenna array 135 to IF and baseband unit 120 (i.e., RX mode) or are configured to direct outgoing signals from IF and baseband unit 120 to antenna array 135 (i.e., TX mode). In transmit (TX) mode, transceiver 133 up-converts the IF signal from IF and baseband unit 120 to radio frequency (RF) and sends the outgoing RF signal to antenna array 135. In receive (RX) mode, transceiver 133 receives an incoming RF signal from antenna array 135 and down-converts from RF to IF.

In the exemplary embodiment, at least one signal characteristic of at least one signal stream is detected by signal sensor 131 on the Data Path between IF and baseband unit 120 and RF unit 130. Signal sensor 131 converts the signal characteristic into at least one measurement. The measurement may be further processed to become a digital signal. The measurement is provided to a controller (not shown) that uses the measurement to control a configuration of the RF unit.

Deriving the T/R switch control based on signal sensing by sensor 131 enables RF unit 130 to operate with IF and baseband unit 120, which does not provide an explicit T/R switch control signal. In particular, if signal sensor 131 detects an IF signal on Data Path, then wireless apparatus 100 is operating in transmit (TX) mode and T/R switches 132 and 134 are configured to direct outgoing signals from IF and baseband unit 120 to antenna array 135. If signal sensor 131 does not detect an IF signal on Data Path, then wireless apparatus 100 is operating in receive (RX) mode and T/R switches 132 and 134 are configured to direct incoming signals from antenna array 135 to IF and baseband unit 120. Alternatively, if signal sensor 131 does not detect an IF signal on Data Path, then wireless apparatus 100 may simply be shut off or put into an idle (or power saving) mode.

This enables RF unit 130 to operate with IF and baseband unit 120 that does not provide an external control interface at all. This configuration is illustrated in FIG. 1. In this configuration, the only connection between RF unit 130 and IF and baseband unit 120 is Data Path. There is no explicit control path between IF and baseband unit 120 and RF unit 130 in FIG. 1. By detecting the TX/RX mode on the Data Path, RF unit 130 may change its own TX/RX mode accordingly.

Figure 2:
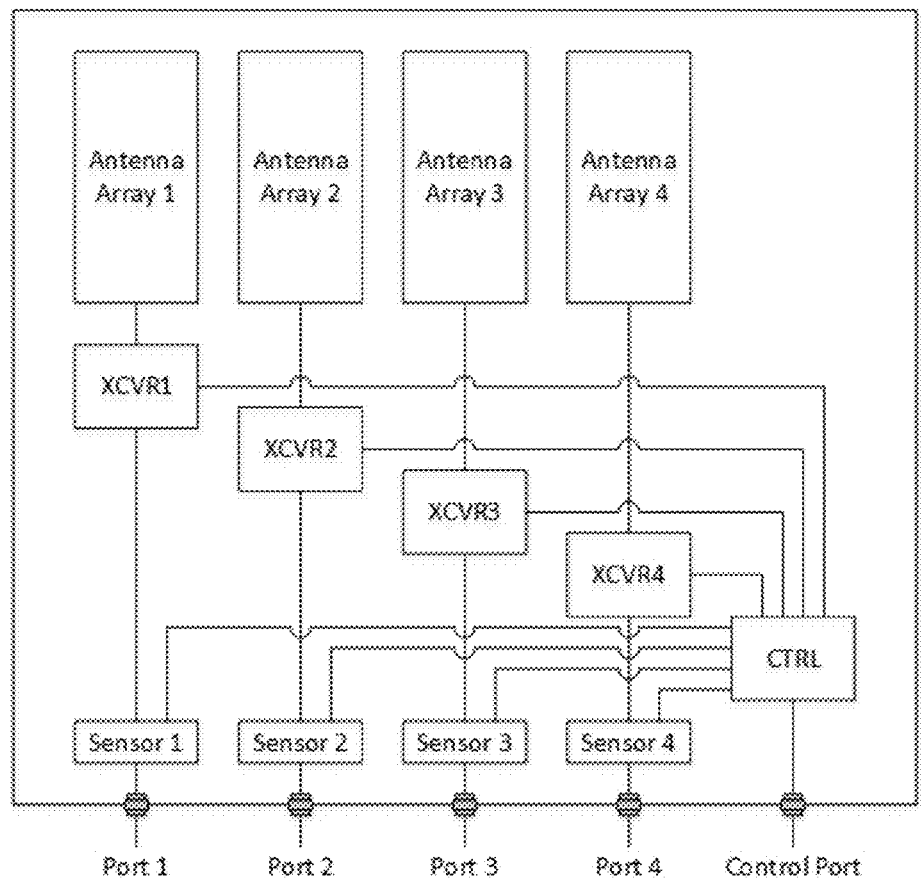
FIG. 2 illustrates a wireless apparatus that uses signal sensing-based control of an RF unit with four transceivers coupled to an intermediate frequency (IF) and baseband unit according to an embodiment of the disclosure.

FIG. 2 illustrates RF unit 200, which uses signal sensing-based control of four (4) radio frequency (RF) transceivers coupled to an IF and baseband unit (not shown) according to an embodiment of the disclosure. In FIG. 2, there are four (4) data paths (i.e., Ports 1-4) between RF unit 200 and the IF and baseband unit. RF unit 200 comprises a plurality of RF transceivers (XCVR1, XCVR2, XCVR3, XCVR4), a plurality of antenna arrays (i.e., Antenna Arrays 1-4), a plurality of signal sensors (Sensors 1-4), and a controller (CTRL).

In FIG. 2, Sensors 1-4 independently detect the presence of IF signals on Ports 1-4, respectively. If one of Sensors 1-4 detects an IF signal, the corresponding sensor sends a measurement or control signal to the controller (CTRL). The controller collects the measurements and/or control signals from Sensors 1-4, and derives control signals for transceivers XCVR1-XCVR4. By way of example, it is assumed that the controller implements OR logic for enabling TX mode for the transceivers XCVR1-XCVR4.

If at least one of Sensors 1-4 detects an IF signal on Ports 1-4, then at least one of Sensors 1-4 sends a Detect signal to the controller. Based on the OR logic, the controller may put transceivers XCVR1-XCVR4 in TX mode and send out control signals to transceivers XCVR1-XCVR4 accordingly. This causes transceiver XCVR1-XCVR4 to up-convert the IF signals from Sensors 1-4 to RF and to output the RF signals to Antenna Arrays 1-4. In no IF signals were detected on any of Ports 1-4, then none of transceivers XCVR1-XCVR4 operates in TX mode and RF unit 200 would be in receive mode or inactive.

Optionally, controller CTRL may take into account a control or configuration signal on Control Port from other devices to determine whether any of transceivers XCVR1-XCVR4 should be in RX mode or TX mode. For example, the thresholds for sensors to detect an IF signal, and the logic for the controller to derive the control signals based on the sensors input, can be configured or controlled via the Control Port.

In order to sense whether IF and baseband unit 120 is transmitting or receiving, the signal sensor(s) is (are) used to detect each signal stream. The signal sensor may be, for example, a power detector. For purpose of illustration, it is assumed IF and baseband unit 120 is a Wi-Fi or Wi-Fi based device. When IF and baseband unit 120 operates in TX mode, the input power at the data communication ports of the transceiver (i.e., Ports 1-4) is typically around −10 dBm to 30 dBm. When IF and baseband unit 120 operates in RX mode, the output power at the data communication ports is typically around −90 dBm to −30 dBm. By detecting the power of the signal, the RF unit can detect the operating mode of the IF and baseband unit and configure its own circuits accordingly.

Although in FIG. 2 the sensors are pictorially shown to be placed directly on the data paths that carry the signal streams, there are many implementations that can minimize the disturbance of the sensors to the signals. For example, a coupler can be used to sense the signal stream without causing significant distortion or insertion loss due to the sensor. The couplers are placed close to but not in contact with the signal streams. The signal streams cause a small signal on the output of the couplers. The output of the couplers can then be fed into the detectors (possibly after amplification) to detect the signal characteristics (e.g., power level) based on which of the TX mode or RX mode can be inferred.

FIGS. 3A-3D illustrates exemplary signal sensors according to different embodiments of the disclosure. The signal sensors can be implemented in a variety of ways without departing from the spirit and scope of the present invention.

FIG. 3A shows detector 310, which is inserted directly on the signal transmission line. Detector 310 may comprise a power detector or a current sensor. The output of detector 310 may comprise a voltage signal, a current signal, or a digitized value of a measurement result.

FIG. 3B shows a sensing circuit comprising sensor 321, sensor 322, which are inserted directly on the signal transmission line, and detector 320, which takes the outputs of sensors 321 and 322 to generate the detector output. Sensors 321 and 322 may be power detectors or current sensors. Detector 320 comprises a comparator circuit that compares the outputs of sensors 321 and 322 and derives the detector output accordingly. For example, detector 320 may compare the power levels of the outputs of the two sensors. Signals, especially high frequency signals, incur loss as the signals travel through transmission lines. In FIG. 3B, if the IF signal is traveling from left to right, the sampled signal from sensor 321 would have higher power than the sampled signal from sensor 322 at the frequencies of interest (i.e., IF signals).

FIG. 3C shows a sensing circuit comprising coupler 332. Coupler 332 is not in contact with the signal transmission line but is able to sample the signal as it is within close proximity of the transmission line. Coupler 332 may be implemented in a variety of ways without departing from the spirit and scope of the disclosure. Coupler 332 may be a directional coupler so that the output of coupler 332 has a smaller coupling loss for signal traveling in one direction versus the other. This can be helpful in distinguishing the signal traveling direction (i.e., whether the IF and baseband unit is transmitting or receiving) by further separating the sensed power level for the transmitted signal or the received signal.

For example, assuming the transmitted signal power ranges from −10 dBm to 30 dBm, and the received signal power ranges from −90 dBm to −30 dBm. The difference between the transmitted signal with the lowest power (i.e., −10 dBm) and the received signal with the highest power (i.e., −30 dBm) is 20 dB. If directional coupler 322 has a coupling loss of −5 dB for the transmitted signal and a coupling loss of −15 dB for the received signal, the sampled transmitted signal power then ranges from −15 dBm to 25 dBm, and the sampled received signal power ranges from −105 dBm to −45 dBm. The difference between the sampled transmitted signal with the lowest power (i.e., −15 dBm) and the sampled received signal with the highest power (i.e., −45 dBm) now increases to 30 dB. This design makes the detection of TX/RX mode based on sensed signal power level more reliable. The output of coupler 332 may be further processed by amplifier 331, which amplifies the sampled signal, and detector 330, which detects the voltage, or current, or power of the sampled and amplified signal.

FIG. 3D illustrates a sensing circuit comprising two couplers 343 and 344, amplifiers 341 and 342, and detector 340. Couplers 343 and 34 are not in contact with the signal transmission line but are able to sample the signal as they are within close proximity of the transmission line. The outputs of couplers 343 and 344 are processed by amplifiers 341 and 342, which amplify the sampled signals, and detector 340, which detects the voltage, or current, or power of the sampled and amplified signals. Detector 340 may be a comparator circuit that compares the output of sensors 343 and 344 and derives the detector output accordingly.

Figure 4:
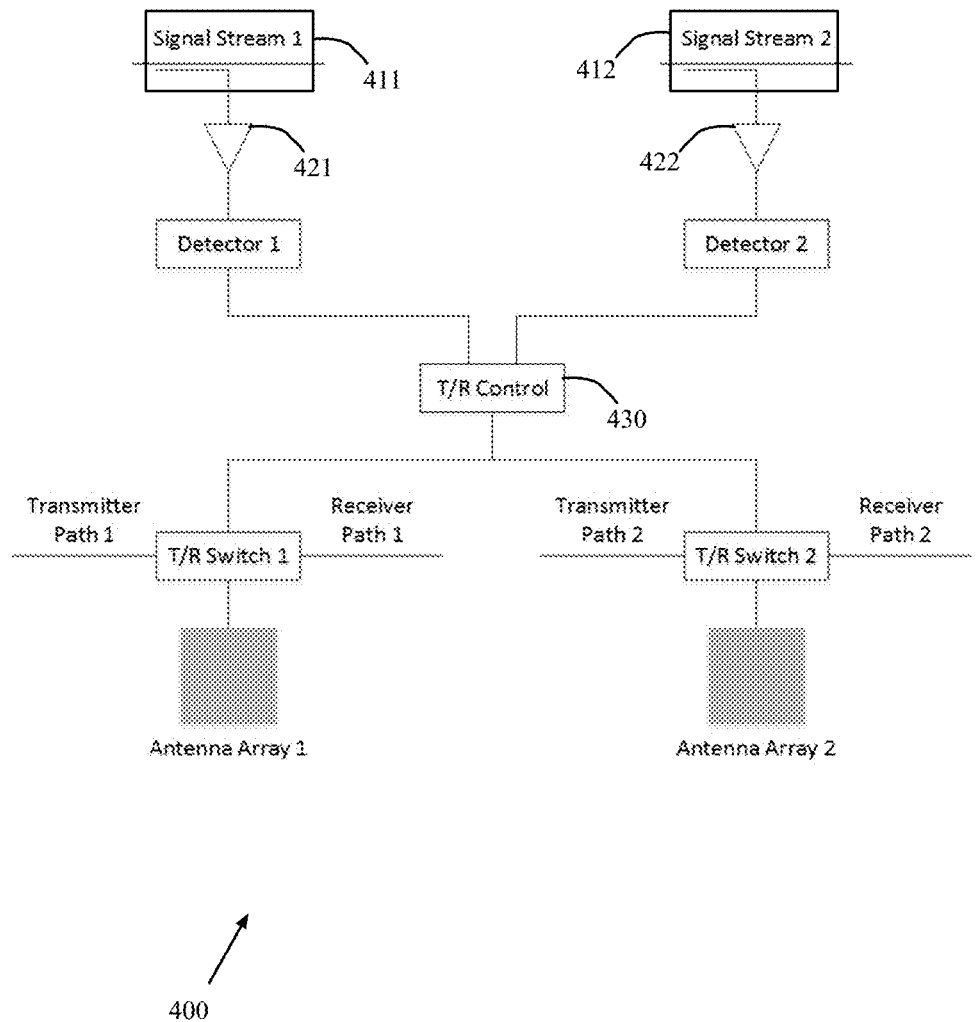
FIG. 4 illustrates the operation of the signal sensing circuits with the transceiver controllers according to one embodiment of the disclosure.

FIG. 4 illustrates the operation of the signal sensing circuits within RF unit 400 according to one embodiment of the disclosure. In this example, the RF unit has two signal steams: Signal Stream 1 and Signal Stream 2. Couplers 411 and 412 are put in close proximity to both signal streams and detect the signal power on each line. Amplifiers 421 and 422 amplify the detected signal from each line. Detectors 1 and 2 convert the amplified sampled signals from couplers 411 and 412 to voltage signals. These voltage signals may be further converted to digital signals in T/R control circuit 430 (e.g., by Schmitt Triggers).

A Schmitt Trigger outputs a Logic 1 when the input voltage rises above a certain threshold, which is denoted by $V_{Th\_High}$, and outputs a Logic 0 when the input voltage falls below a certain threshold, which is denoted by $V_{Th\_Low}$. The ability to set different thresholds for rise and fall allows some hysteresis to suppress erroneous T/R control due to noise in the signal lines and sensing circuits. T/R control circuit 430 may implement certain control logic or algorithms. For example, T/R control circuit 430 may include a logic OR gate, wherein the T/R control circuit 430 output is set to Logic 1 as long as one of the detector outputs (the output of the Schmitt Trigger of the detector) is Logic 1. The output of T/R control circuit 430 controls the T/R switches for both signal streams. If the T/R control output is set to Logic 1, T/R switches 1 and 2 both switch to transmit mode. If the T/R control output is set to Logic 0, then T/R switches 1 and 2 both switch to receive mode.

Figure 5:
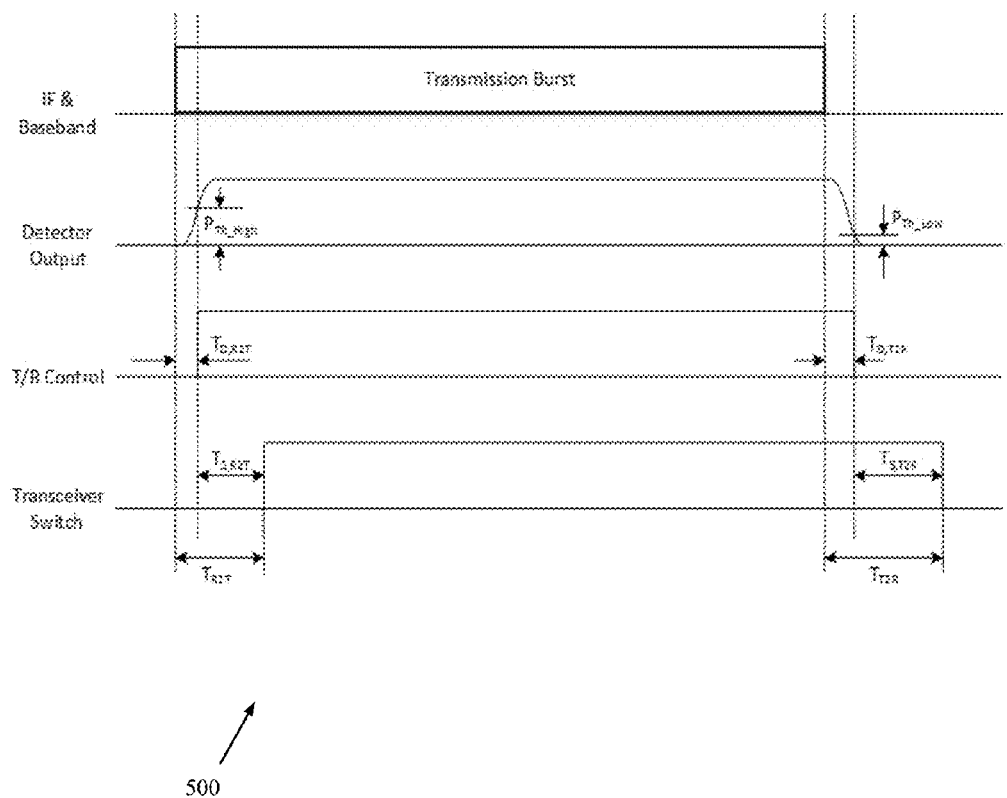
FIG. 5 illustrates a timing diagram of the signal sensing-based T/R control according to one embodiment of the disclosure.

FIG. 5 illustrates timing diagram 500 for the signal sensing-based T/R control according to one embodiment of the disclosure. The time domain behavior of the IF and baseband unit, the power detector, the T/R control circuit, and the T/R switch is illustrated in FIG. 5. Initially, the IF and baseband unit operates in receive mode (or other non-TX modes). When a transmission burst occurs, the IF and baseband unit switches to transmit (TX) mode. The IF and baseband unit transmits the signals via the data communication port(s) to the transceiver. For a Wi-Fi based IF and baseband unit, the output power is typically around −10 dBm to 30 dBm.

This signal causes the output of the power detector to rise above the threshold $P_{Th\_High}$ that will set the following Schmitt Trigger to Logic 1. The rise time for the power detector is denoted by $T_{D,\ R2T}$, which is typically on the order of a few nanoseconds to a few hundred nanoseconds. It is generally preferable to choose a power detector with a short rise/fall time to minimize this delay. For simplicity of the illustration, the delay of the T/R control circuit is not shown. In the given example of a Schmitt Trigger and a logic "OR" gate, the delay of such a T/R control circuit can be as low as a few nanoseconds. Once the T/R control output is set to Logic 1, the Transceiver Switch switches to transmit (TX) mode. The time for the transceiver to switch from receiver mode to transmit mode is denoted by $T_{S,\ R2T}$. The transceiver switching time is typically around a few hundred nanoseconds. The total time needed for the transceiver to detect the transmission signal and to switch to transmit mode is denoted by $T_{R2T}=T_{D,\ R2T}+T_{S,\ R2T}$. With proper design and choice of components, it is possible to control the switch time to less than 500 nanoseconds. For Wi-Fi devices, this has negligible impact to the system performance.

When a Transmission Burst ends, the IF and baseband unit either switches to RX mode or simply shuts off the transmitter. In either case, the signal power level at the data communication ports drops significantly (or disappears completely). This causes the output of the power detectors to drop below the threshold $V_{Th\_Low}$ that sets the following Schmitt Trigger to Logic 0. The fall time for the power detector is denoted by $T_{D,\ T2R}$, which is typically on the order of a few nanoseconds to a few hundred nanoseconds. It is generally preferable to choose a power detector with a short rise/fall time to minimize the delay. For simplicity of the illustration, the delay of the TX/RX control circuit is not shown. In the given example of a Schmitt Trigger and a logic OR gate, the delay of such a TX/RX control circuit can be as low as a few nanoseconds.

Once the TX/RX control output is set to Logic 0, the Transceiver Switch switches to receive mode. The time for the transceiver to switch from transmit mode to receive mode is denoted by $T_{S,\ T2R}$. The transceiver switching time is typically around a few hundred nanoseconds. The total time needed for the transceiver to detect the drop of the signals and to switch to receive mode is denoted by $T_{T2R}=T_{D,\ T2R}+T_{S,\ T2R}$. With proper design and choice of components, it is possible to control the switch time to less than 500 nanoseconds. For Wi-Fi devices, this has negligible impact to performance. Note that once the transceiver is switched to receive mode, the received signal from receiver antennas appears on the signal path. However, for typical configurations of the transceiver, the received signal at the data communication port(s) is not expected to be higher than −30 dBm. With proper setting of the power detectors and Schmitt triggers, the received signal power level should not trigger the TX/RX control circuit back to transmit mode and so that the TX/RX control circuit stays in receive mode until the IF and baseband unit transmits the next Transmission Burst.

Figure 6A:
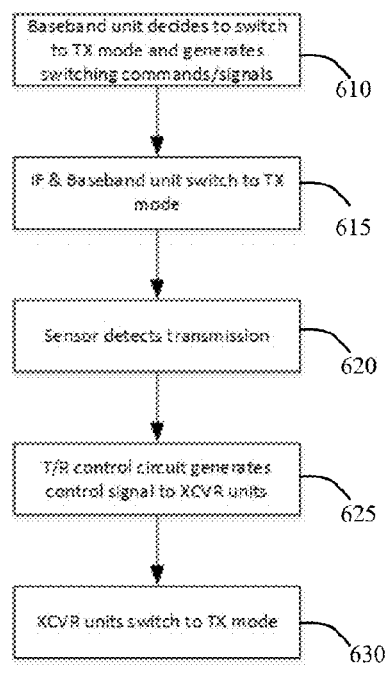
FIGS. 6A and 6B illustrate exemplary processes of signal sensing-based transceiver control according to one embodiment of the disclosure.
Figure 6B:
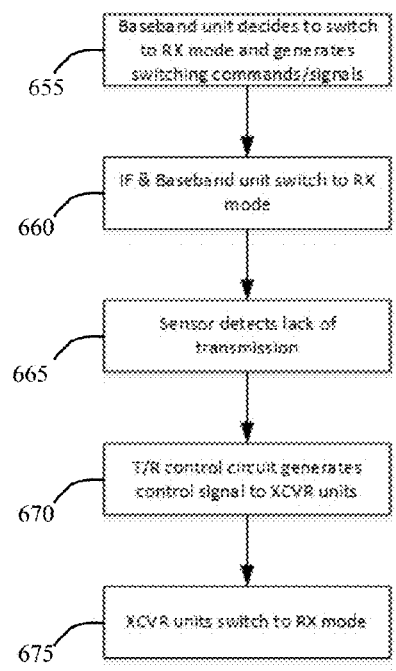

FIGS. 6A and 6B illustrate exemplary processes of signal sensing-based transceiver control according to one embodiment of the disclosure. In FIG. 6A, it is assumed that a wireless communication device includes an RF unit and an IF and baseband unit. The IF and baseband unit runs a Wi-Fi 802.11ac based wireless communication protocol that reuses the physical layer and baseband processing of Wi-Fi 802.11ac, but with a modified TDMA medium access control protocol to operate more efficiently in a licensed spectrum. It is assumed the operation is TDD, such that the wireless communication device transmits and receives in the same band but in different time. FIG. 6A shows an exemplary process when the transceiver switches to TX mode in steps 610, 615, 620, 625 and 630. FIG. 6B shows an exemplary process when the transceiver switches to RX mode in steps 655, 660, 665, 670 and 675. As long as the sensing mechanism and the TX/RX control circuits can quickly detect the transmission signal and the lack thereof, the RF unit is able to quick change its TX/RX mode to follow the IF and baseband unit (typically 500 nanoseconds or less) so that the wireless communication device can operate effectively.

Note that some wireless communication protocols may introduce other non-transmit modes or non-transmission time intervals due to operations such as discontinuous transmission or power saving. In these cases, the sensors still detect the transmission signals when they occur and the lack thereof. As such, the RF unit still properly switches to the transmit mode when the IF and baseband unit is in transmit mode and switches to the receive mode when the IF and baseband unit is in receive mode or other non-transmit modes or time intervals.

Figure 7:
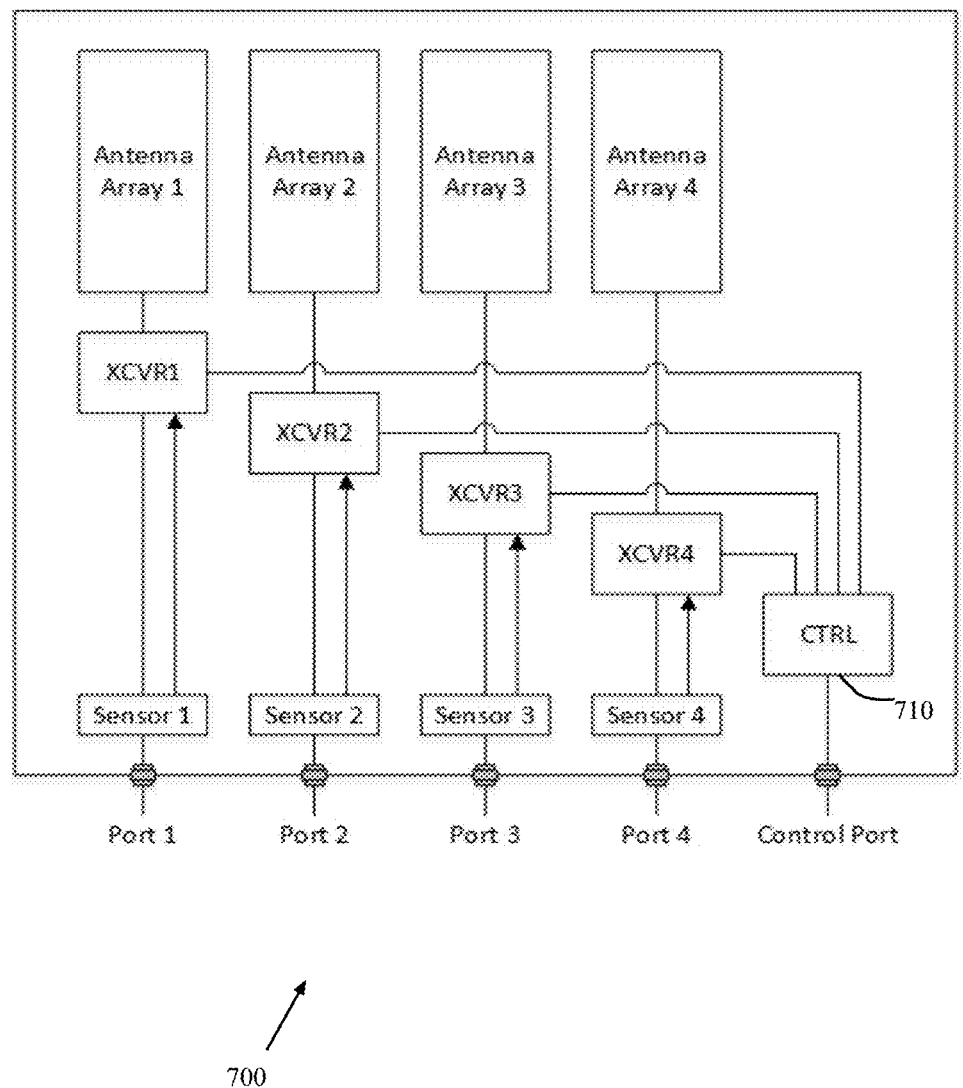
FIG. 7 illustrates an RF unit that uses signal sensing-based control of a plurality of transceivers according to an embodiment of the disclosure.

FIG. 7 illustrates RF unit 700, which uses signal sensing-based control of a plurality of transceivers coupled to an IF and baseband unit (not shown) according to an embodiment of the disclosure. RF unit 700 is similar to RF unit 200 in FIG. 2 in most respects. RF unit 700 comprises a plurality of RF transceivers (XCVR1, XCVR2, XCVR3, XCVR4), a plurality of antenna arrays (i.e., Antenna Arrays 1-4), a plurality of signal sensors (Sensors 1-4), and a controller (CTRL).

However, in FIG. 7, the control signals generated by Sensors 1-4 are not sent directly to the controller (CTRL). At least one signal sensor generates at least one control signal that directly controls at least one transceiver unit. In FIG. 7, each one of Sensors 1-4 generates a control signal that controls a corresponding one of transceivers XCVR1-XCVR4. Each one of Sensors 1-4 also passes the received IF signal from one of Ports 1-4 to a corresponding one of transceivers XCVR1-XCVR4. By sending the control signal directly to the transceiver unit for the signal stream instead of going through a central controller unit, the RF unit 700 bypasses the additional delay that may occur due to the processing at the central controller 710. Note the central controller 710 can still control and configure other aspects of the transceivers XCVR1-XCVR4, such as phase shifter values, gain control, etc.

Figure 8:
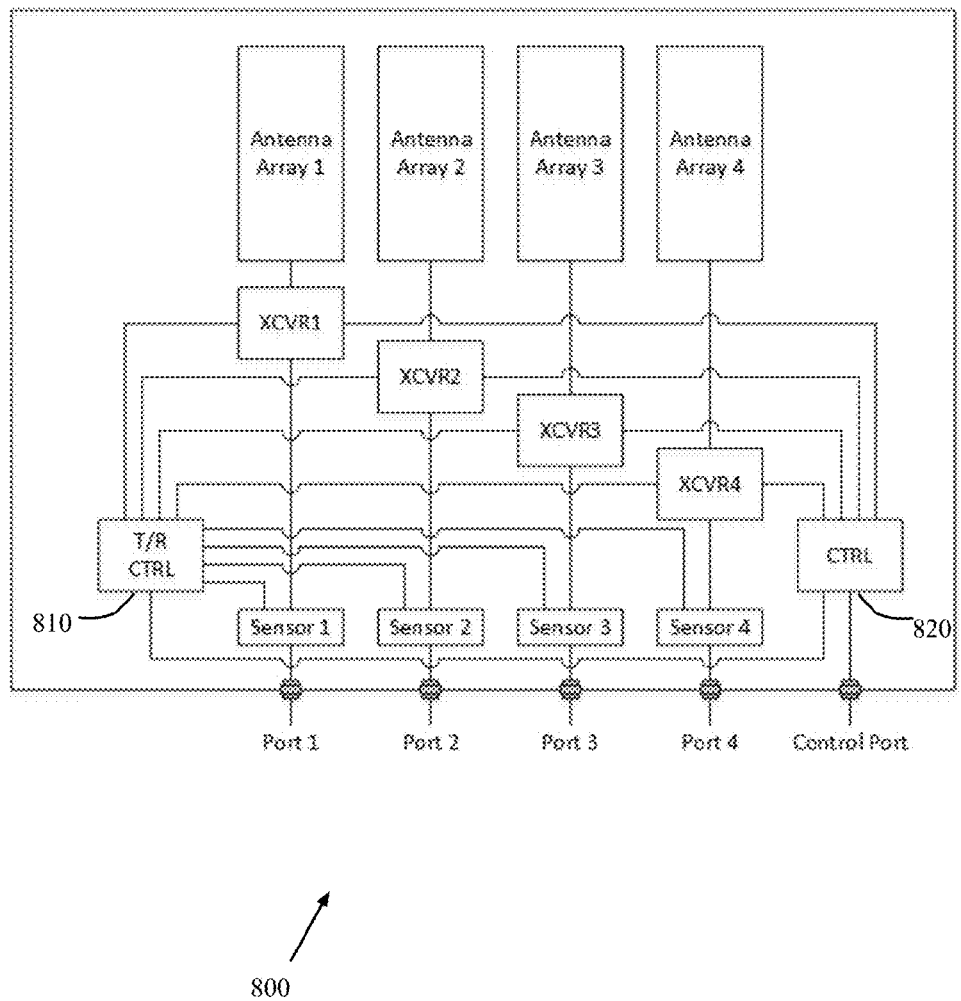
FIG. 8 illustrates an RF unit that uses signal sensing-based control of a plurality of transceivers according to an embodiment of the disclosure.

FIG. 8 illustrates RF unit 800, which uses signal sensing-based control of a plurality of transceivers coupled to an IF and baseband unit (not shown) according to an embodiment of the disclosure. RF unit 800 is similar to RF unit 700 in FIG. 7 in most respects. RF unit 800 comprises a plurality of RF transceivers (XCVR1, XCVR2, XCVR3, XCVR4), a plurality of antenna arrays (i.e., Antenna Arrays 1-4), a plurality of signal sensors (Sensors 1-4), and controller (CTRL) 820.

However, RF unit 800 also comprises dedicated transmit/receive (T/R) controller 810 that receives control signals from each of Sensors 1-4. The control signals from Sensors 1-4 are not directly coupled to transceivers XCVR1-XCVR4. T/R controller 810 is implemented to process at least one output signal of at least one signal sensor. In FIG. 8, the output signals of all four (4) sensors are processed in T/R controller 810. T/R controller 810 derives the T/R control commands based on the sensor output signals. T/R controller 810 commands are then used to control the transceiver units directly without going through central controller 820. In this way, dedicated circuits may be implemented for fast T/R switching. T/R controller 810 may also implement additional processing and logic to improve other performance metrics, such as high reliability and robustness in addition to fast T/R switching speed. Optionally, an output of dedicated T/R controller 810 may also be fed into the central controller 820. Controller 820 may take into account the T/R controller 810 output in generating other configuration and control commands for the transceiver units.

Figure 9:
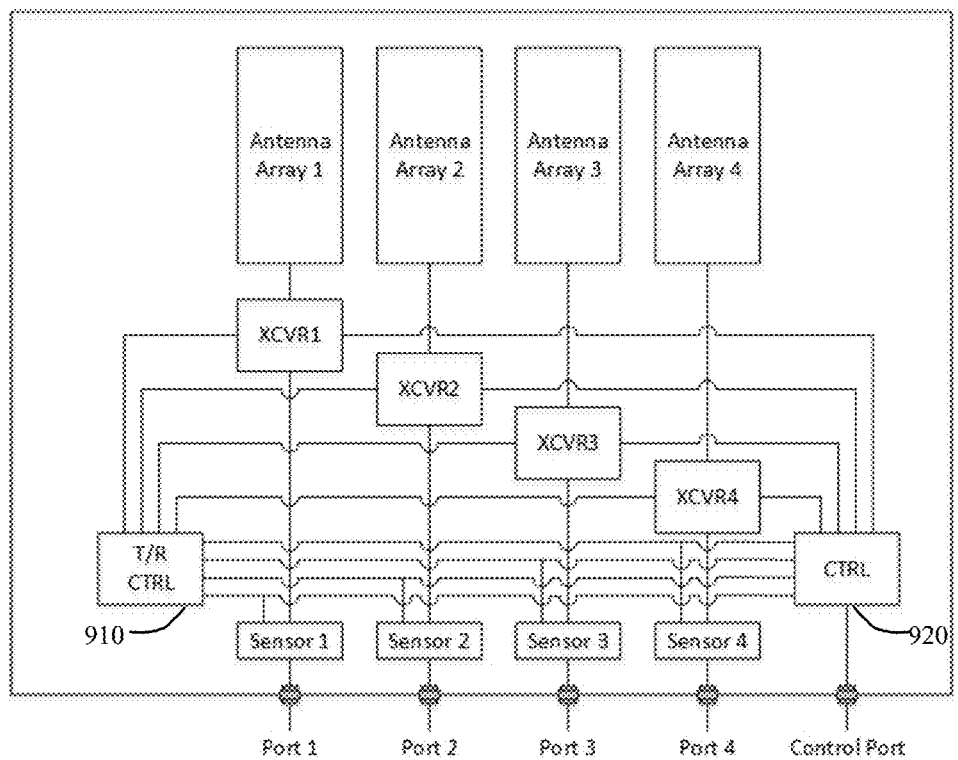
FIG. 9 illustrates an RF unit that uses signal sensing-based control of a plurality of transceivers according to an embodiment of the disclosure.

FIG. 9 illustrates RF unit 900, which uses signal sensing-based control of a plurality of transceivers coupled to an IF and baseband unit (not shown) according to an embodiment of the disclosure. In FIG. 9, all of Sensors 1-4 produce a pair output control signals which are sent to T/R controller 910 and central controller 920. For example, Sensor 1 produces a first output control signal that is fed to central controller 920, while a second output control signal is fed to dedicated T/R controller 910. This allows dedicated T/R controller 910 to make fast decisions on T/R switching for the transceivers, while also allowing central controller 920 to receive the sensor output for other configuration and control of the transceiver units.

Figure 10:
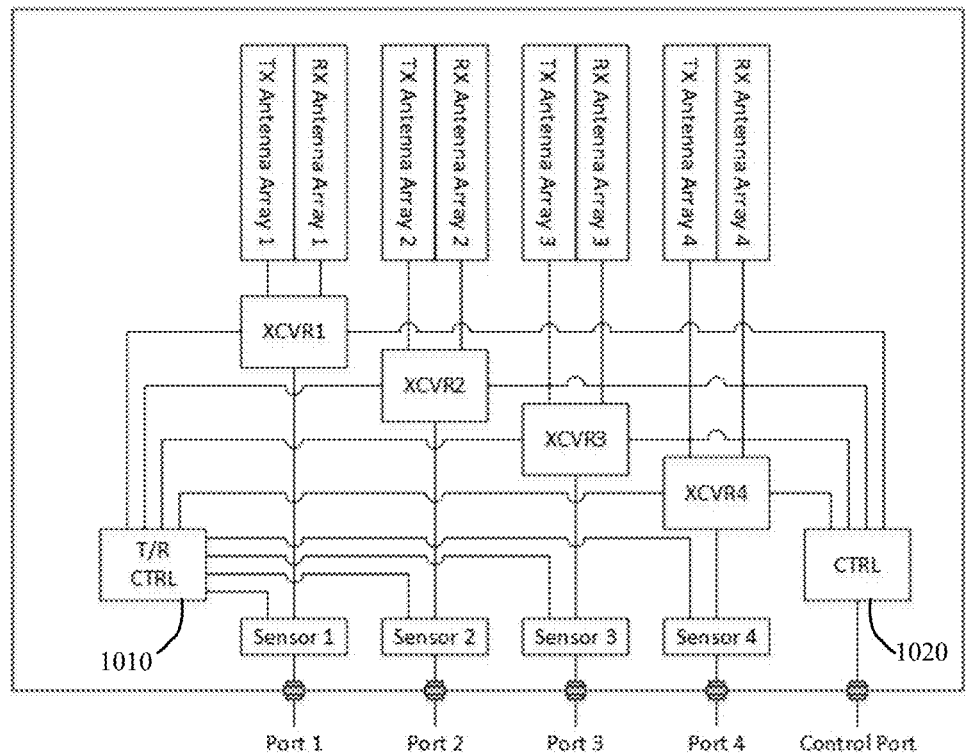
FIG. 10 illustrates an RF unit that uses signal sensing-based control of a plurality of transceivers according to an embodiment of the disclosure.

FIG. 10 illustrates RF unit 1000, which uses signal sensing-based control of a plurality of transceivers coupled to an IF and baseband unit (not shown) according to an embodiment of the disclosure. RF unit 1000 is similar to RF unit 800 in FIG. 8 in most respects. However, in the new embodiment, at least one transceiver unit transmits and receives via separate antenna arrays.

In FIG. 10, all four of transceivers XCVR1-XCVR4 transmit and receive via separate antenna arrays. Each single-stream transceiver unit is connected to a transmitter antenna array and a separate receiver antenna array. When dedicated T/R controller 1010 detects that the IF and baseband unit is operating in transmit mode, T/R controller 1010 sets the transceiver units to transmit mode. The transceiver units up-convert the signal streams to RF and transmit the signals via the transmitter antenna arrays. When T/R controller 1010 detects that the IF and baseband unit is operating in receive mode, T/R controller 1010 sets the transceiver units to receive mode. The transceiver units down-convert the received signal streams from the receiver antenna arrays to IF or baseband for further processing.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless apparatus comprising:
   an intermediate frequency (IF) unit configured to transmit and to receive IF signals; and
   a radio frequency (RF) unit configured to transmit and to receive RF signals via an antenna and to receive IF signals from the IF unit and to transmit IF signals to the IF unit, wherein the RF unit comprises:
      a first sensor coupled to a first port of the RF transceiver unit, wherein the first sensor is configured to determine whether an incoming IF signal transmitted by the IF unit is present on the first port; and
      a first transceiver configured to be controlled by the first sensor, wherein the first transceiver is switched to transmit mode in response to the first sensor determining that an incoming IF signal is present on the first port.

2. The wireless apparatus as set forth in claim 1, wherein the first transceiver is switched to receive mode in response to the first sensor determining that an incoming IF signal is not present on the first port.

3. The wireless apparatus as set forth in claim 1, wherein the first transceiver is switched off in response to the first sensor determining that an incoming IF signal is not present on the first port.

4. The wireless apparatus as set forth in claim 1, wherein the RF unit further comprises a first controller coupled to the first sensor and configured to receive a first control signal from the first sensor, wherein the first controller switches the first transceiver to transmit mode.

5. The wireless apparatus as set forth in claim 4, wherein the first controller switches the first transceiver to transmit mode in response to the first control signal indicating that the first sensor determined that an incoming IF signal is present on the first port.

6. The wireless apparatus as set forth in claim 4, wherein the RF unit further comprises:
   a second sensor coupled to a second port of the RF unit, wherein the second sensor is configured to determine whether an incoming IF signal transmitted by the IF unit is present on the second port; and
   a second transceiver configured to be controlled by the first controller, wherein the second transceiver is switched to transmit mode in response to the second sensor determining that an incoming IF signal is present on the second port.

7. The wireless apparatus as set forth in claim 6, wherein the second transceiver is switched to receive mode in response to the second sensor determining that an incoming IF signal is not present on the second port.

8. The wireless apparatus as set forth in claim 6, wherein the second transceiver is switched off in response to the second sensor determining that an incoming IF signal is not present on the second port.

9. The wireless apparatus as set forth in claim 6, wherein the first controller is coupled to the second sensor and configured to receive a second control signal from the second sensor, wherein the first controller switches the second transceiver to transmit mode.

10. The wireless apparatus as set forth in claim 9, wherein the first controller switches the second transceiver to transmit mode in response to either the first control signal indicating that the first sensor determined that an incoming IF signal is present on the first port or the second control signal indicating that the second sensor determined that an incoming IF signal is present on the second port.

11. A wireless apparatus comprising:
    a radio frequency (RF) unit configured to transmit and to receive RF signals via an antenna and to receive intermediate frequency (IF) signals from an IF unit and to transmit IF signals to the IF unit, wherein the RF unit comprises:
       a first sensor coupled to a first port of the RF transceiver unit, wherein the first sensor is configured to determine whether an incoming IF signal transmitted by the IF unit is present on the first port; and
       a first transceiver configured to be controlled by the first sensor, wherein the first transceiver is switched to transmit mode in response to the first sensor determining that an incoming IF signal is present on the first port.

12. The wireless apparatus as set forth in claim 11, wherein the first transceiver is switched to receive mode in response to the first sensor determining that an incoming IF signal is not present on the first port.

13. The wireless apparatus as set forth in claim 11, wherein the first transceiver is switched off in response to the first sensor determining that an incoming IF signal is not present on the first port.

14. The wireless apparatus as set forth in claim 11, wherein the RF unit further comprises a first controller coupled to the first sensor and configured to receive a first control signal from the first sensor, wherein the first controller switches the first transceiver to transmit mode.

15. The wireless apparatus as set forth in claim 14, wherein the first controller switches the first transceiver to transmit mode in response to the first control signal indicating that the first sensor determined that an incoming IF signal is present on the first port.

16. The wireless apparatus as set forth in claim 14, wherein the RF unit further comprises:
    a second sensor coupled to a second port of the RF unit, wherein the second sensor is configured to determine whether an incoming IF signal transmitted by the IF unit is present on the second port; and
    a second transceiver configured to be controlled by the first controller, wherein the second transceiver is switched to transmit mode in response to the second sensor determining that an incoming IF signal is present on the second port.

17. The wireless apparatus as set forth in claim 16, wherein the second transceiver is switched to receive mode in response to the second sensor determining that an incoming IF signal is not present on the second port.

18. The wireless apparatus as set forth in claim 16, wherein the second transceiver is switched off in response to the second sensor determining that an incoming IF signal is not present on the second port.

19. The wireless apparatus as set forth in claim 16, wherein the first controller is coupled to the second sensor and configured to receive a second control signal from the second sensor, wherein the first controller switches the second transceiver to transmit mode.

20. The wireless apparatus as set forth in claim 19, wherein the first controller switches the second transceiver to transmit mode in response to either the first control signal indicating that the first sensor determined that an incoming IF signal is present on the first port or the second control signal indicating that the second sensor determined that an incoming IF signal is present on the second port.

* * * * *